US012662073B2

(12) United States Patent
    Itoh et al.

(10) Patent No.: US 12,662,073 B2
(45) Date of Patent: Jun. 23, 2026

(54) CONTROL DEVICE

(71) Applicant: TOYOTA JIDOSHA KABUSHIKI KAISHA, Toyota (JP)

(72) Inventors: Takuya Itoh, Toyota (JP); Masato Chiba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/959,644

(22) Filed: Nov. 26, 2024

(65) Prior Publication Data

US 2025/0256667 A1      Aug. 14, 2025

(30) Foreign Application Priority Data

Feb. 9, 2024      (JP) ................................. 2024-018794

(51) Int. Cl.
     *B60R 16/033*         (2006.01)
     *H02J 7/00*           (2026.01)
(52) U.S. Cl.
     CPC ............ *B60R 16/033* (2013.01); *H02J 7/855* (2026.01); *H02J 2207/20* (2020.01)
(58) Field of Classification Search
     CPC .... B60R 16/033; H02J 7/0063; H02J 2207/20
     See application file for complete search history.

(56) References Cited

U.S. PATENT DOCUMENTS

2011/0260452 A1*   10/2011   Ogawa .................... B60L 50/15
                                                  290/31
2016/0362099 A1*   12/2016   Obata ...................... B60K 6/28

FOREIGN PATENT DOCUMENTS

JP            2005-020854 A        1/2005

* cited by examiner

*Primary Examiner* — Rexford N Barnie
*Assistant Examiner* — Terrence R Willoughby
(74) *Attorney, Agent, or Firm* — SoraIP, Inc.

(57)            ABSTRACT

A control device for controlling a power supply system including a DC-to-DC converter that supplies power of a power supply source to a load, an alternator that is connected in parallel with DC-to-DC converter so as to be capable of supplying power generated by rotation of the engine to the load, and a battery that is connected to the load so as to be capable of supplying power, the control device comprising: an acquisition unit that acquires information regarding a current of the battery; and a control unit that controls an operation of the engine and the alternator based on the information, wherein the control unit prohibits stopping of the engine in operation when the battery is in a discharging state for outputting a current to the load.

7 Claims, 3 Drawing Sheets

CONTROL DEVICE

CROSS-REFERENCE TO RELATED APPLICATION

This application claims priority to Japanese Patent Application No. 2024-018794 filed on Feb. 9, 2024, incorporated herein by reference in its entirety.

BACKGROUND

1. Technical Field

The present disclosure relates to control devices for vehicles that control output power of a power supply system.

2. Description of Related Art

Japanese Unexamined Patent Application Publication No. 2005-020854 (JP 2005-020854 A) discloses a control device that stops an engine (for idle reduction) when a predetermined automatic stop condition based on the engine coolant temperature and the vehicle speed is satisfied in a hybrid electric vehicle.

SUMMARY

The control device described in JP 2005-020854 A determines whether the engine can be stopped based on the engine coolant temperature and the vehicle speed. Therefore, for example, even in a situation where the demand for electric power by a load mounted on the vehicle increases and electric power needs to be supplied not only from a battery but also from an alternator that generates electric power by rotation of the engine, the engine may be stopped if the automatic stop condition is satisfied. In this situation, it is possible to perform control such as restarting the stopped engine in order to supply electric power. However, it is desirable to avoid such an engine operation (restarting the engine immediately after stopping it) because it is wasteful.

The present disclosure was made in view of the above issue, and an object of the present disclosure is to provide a control device that can avoid an engine being stopped when an alternator needs to generate electric power to supply electric power to an in-vehicle load.

In order to solve the above issue, an aspect of the technique of the present disclosure is a control device that controls a power supply system.

The power supply system includes a direct current-to-direct current (DC-to-DC) converter that supplies electric power of a power supply source to a load, an alternator connected in parallel with the DC-to-DC converter in such a manner that the alternator is able to supply electric power generated by rotation of an engine to the load, and a battery connected to the load in such a manner that the battery is able to supply electric power to the load. The control device includes:

an acquisition unit that acquires information on a current of the battery; and a control unit that controls an operation of the engine and an operation of the alternator based on the information.

When the battery is in a discharging state in which the battery outputs a current to the load, the control unit prohibits the engine that is running from being stopped.

According to the control device of the present disclosure, when the alternator also needs to supply electric power, such as when power supply from the DC-to-DC converter is not enough and the battery needs to be discharged to supply electric power to the load, the engine is prohibited from being stopped. This can avoid the engine being stopped when the alternator needs to generate electric power, and can eliminate wasteful stopping and restarting of the engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The control device of the present disclosure determines whether or not the engine can be stopped according to whether or not alternator power generation is required based on whether or not there is a discharge current from the auxiliary battery to the auxiliary load. As a result, it is possible to prevent the engine from being stopped when power generation of the alternator is required.

Hereinafter, an embodiment of the present disclosure will be described in detail with reference to the drawings.

Embodiment

Configuration

Figure 1:
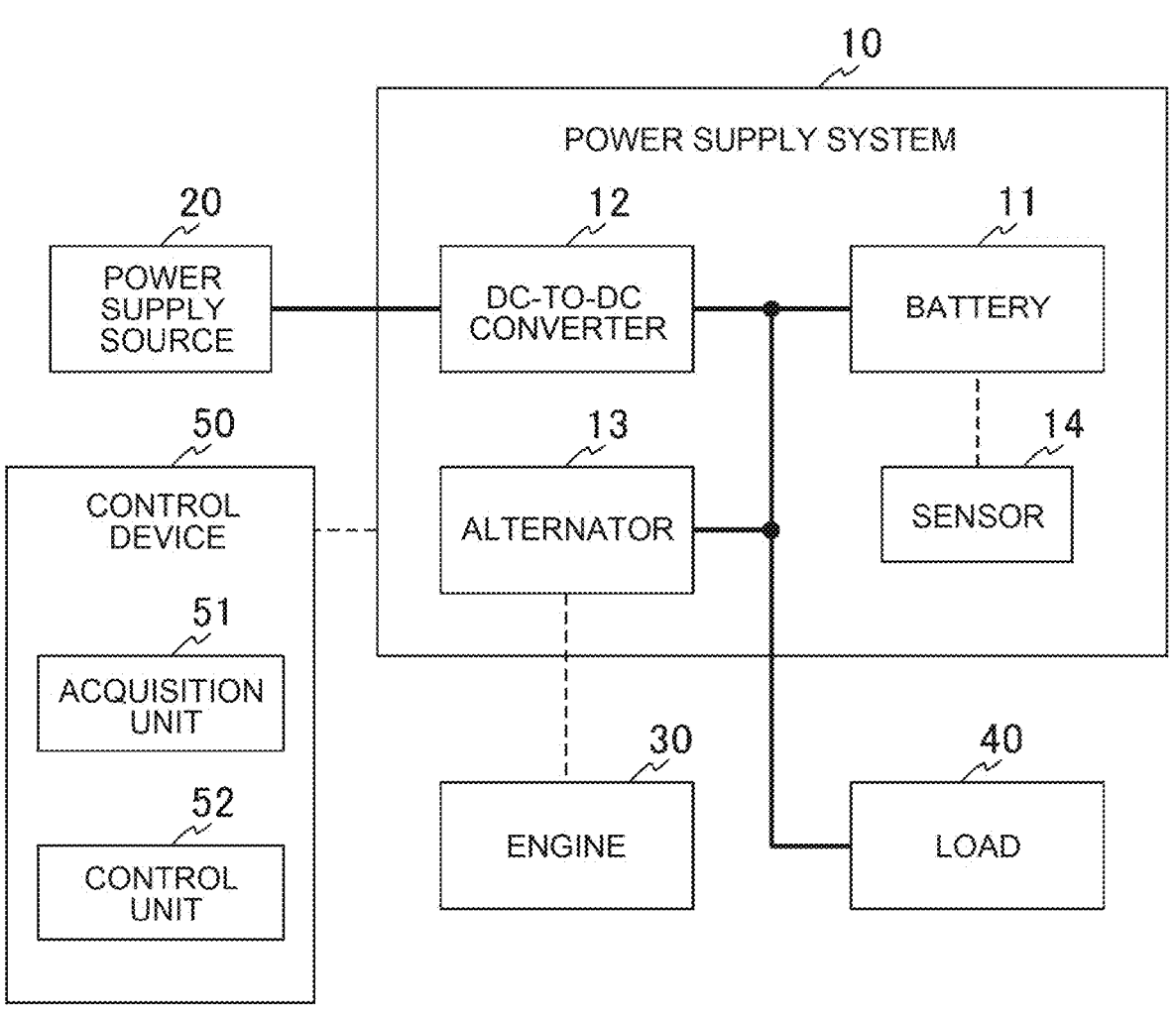
FIG. 1 is a block diagram of a control device and a peripheral portion thereof according to an embodiment of the present disclosure.

FIG. 1 is a functional block diagram illustrating a schematic configuration of a control device 50 and a peripheral portion thereof according to an embodiment of the present disclosure. The functional block illustrated in FIG. 1 includes a power supply system 10, a power supply source 20, an engine 30, a load 40, and a control device 50. In FIG. 1, a power line through which power is transmitted and received is indicated by a solid line, and a signal line through which a control instruction, a detection value, and the like are transmitted and received is indicated by a broken line.

The control device 50 according to the present embodiment is mounted on vehicles such as, for example, hybrid electric vehicle (HEV) and plug-in hybrid electric vehicle (PHEV) using the engine 30 as an internal combustion engine as a power source.

The power supply system 10 is a configuration for supplying power to the load 40. The power supply system 10 includes a battery 11, a DC-to-DC converter 12, an alternator 13, and a sensor 14.

The battery 11 is a secondary battery configured to be chargeable and dischargeable, such as a lithium-ion battery. The battery 11 is connected to DC-to-DC converters 12 so as to be able to be charged by the electric power outputted from the power supply source 20. Further, the battery 11 can supply the electric power stored therein to the load 40. As the battery 11, an auxiliary battery mounted on a vehicle can be exemplified.

DC-to-DC converters 12 are power converters capable of converting the inputted power into a predetermined-voltage power and outputting the converted power. DC-to-DC converters 12 have one end (primary side) connected to the power supply source 20, and the other end (secondary side) connected to the battery 11. DC-to-DC converters 12 can supply the electric power outputted by the power supply source 20 connected to the primary side to the batteries 11 and the loads 40 connected to the secondary side. The operation of DC-to-DC converters 12 is controlled by the control device 50.

The alternator 13 is a generator capable of generating electric power in response to rotation (driving) of the engine 30. The alternator 13 is connected in parallel with DC-to-DC converter 12 so that it can provide its own generated power together with the power of DC-to-DC converter 12 to the battery 11 and loads 40. Whether or not power generation by the alternator 13 is possible (whether or not power generation is output) is controlled by the control device 50.

The sensor 14 is configured to detect at least the current flowing out of the battery 11 and the current flowing into battery 11 as the physical quantity of the battery 11. A detection device such as a current sensor is used for the sensor 14. Information regarding the current of the battery 11 detected by the sensor 14 is output to the control device 50.

The power supply source 20 is a configuration for exclusively supplying electric power to a main engine load (the engine 30 or the like) such as electronic equipment and equipment related to the traveling of the vehicle. The power supply source 20 also supplies power to the load 40, which is an auxiliary load other than the main engine load, via DC-to-DC converters 12. As the power supply source 20, for example, a secondary battery (main battery) such as a lithium-ion battery or a power generation device such as a motor generator that generates regenerative electric power is used.

The engine 30 is an internal combustion engine serving as a power source of the vehicle. The power of the power supply source 20 is used to start the engine 30. Starting/stopping of the engine 30, permission/non-permission thereof, and the like are controlled by the control device 50.

The load 40 is an auxiliary load such as an electronic device or equipment that does not relate to the traveling of the vehicle. The loads 40 are configured to operate mainly by the power of the power supply source 20 supplied via DC-to-DC converters 12 and the power generated by the alternator 13, and in certain cases, by the power of the battery 11.

The control device 50 is a configuration for controlling power to be output (supplied) from the power supply system 10 to the load 40. The control device 50 includes an acquisition unit 51 and a control unit 52.

The acquisition unit 51 acquires information on the current of the battery 11 from the sensor 14 of the power supply system 10. The information on the current of the battery 11 acquired by the acquisition unit 51 is an incoming current (charging current) input by the battery 11 at the time of acquisition (at present) or an outgoing current (discharging current) output by the battery 11.

The control unit 52 controls the operation of the alternator 13 and the engine 30 of the power supply system 10 based on the information on the current of the battery 11 acquired by the acquisition unit 51. Although the details of the control will be described later, in a case where the battery 11 is in a discharging state in which a current is output to the load 40, the control unit 52 performs control for prohibiting the engine 30 in operation from being stopped so that the alternator 13 can generate electric power.

Figure 2A:
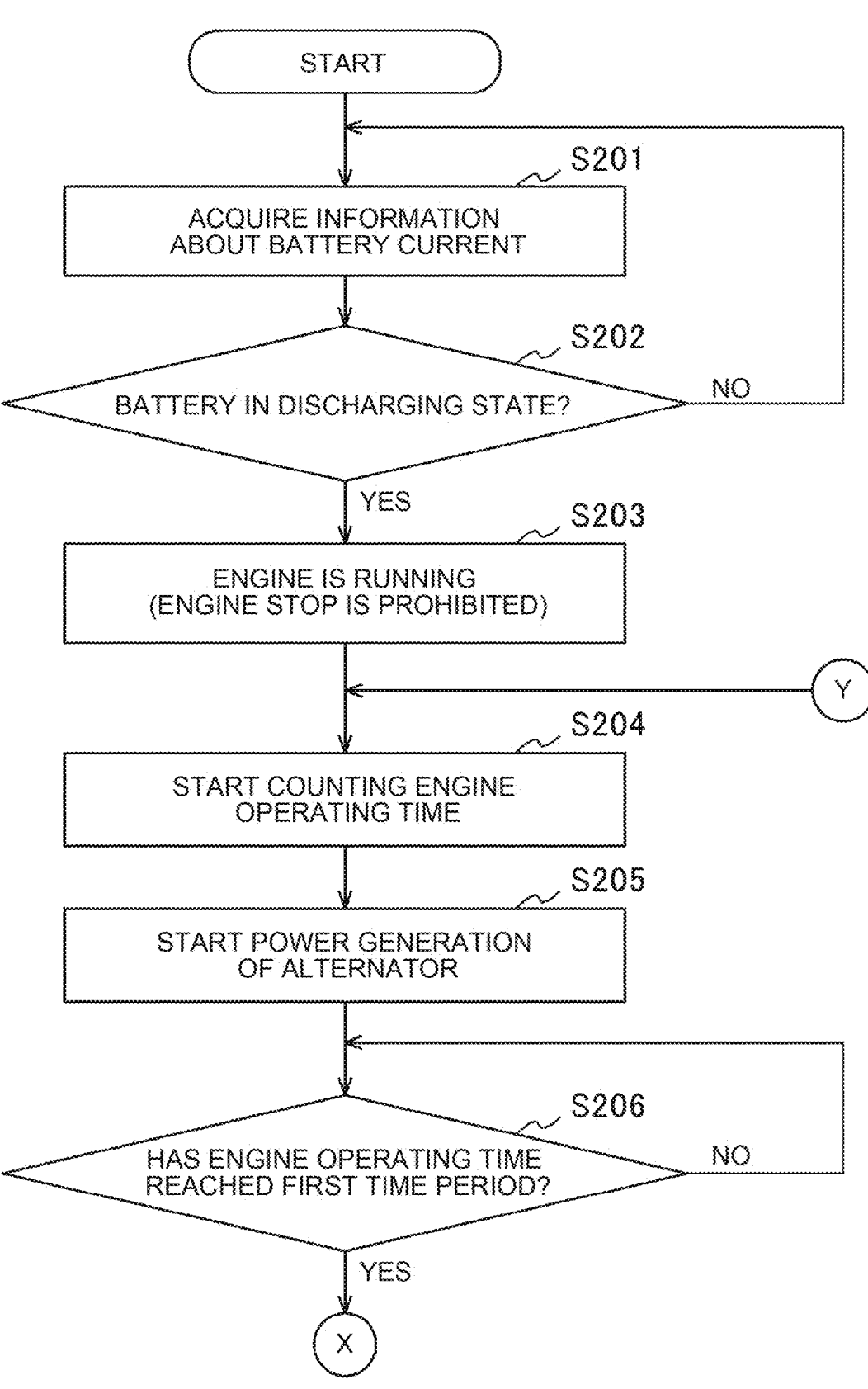
FIG. 2A is a process flowchart of power control executed by a control device.
Figure 2B:
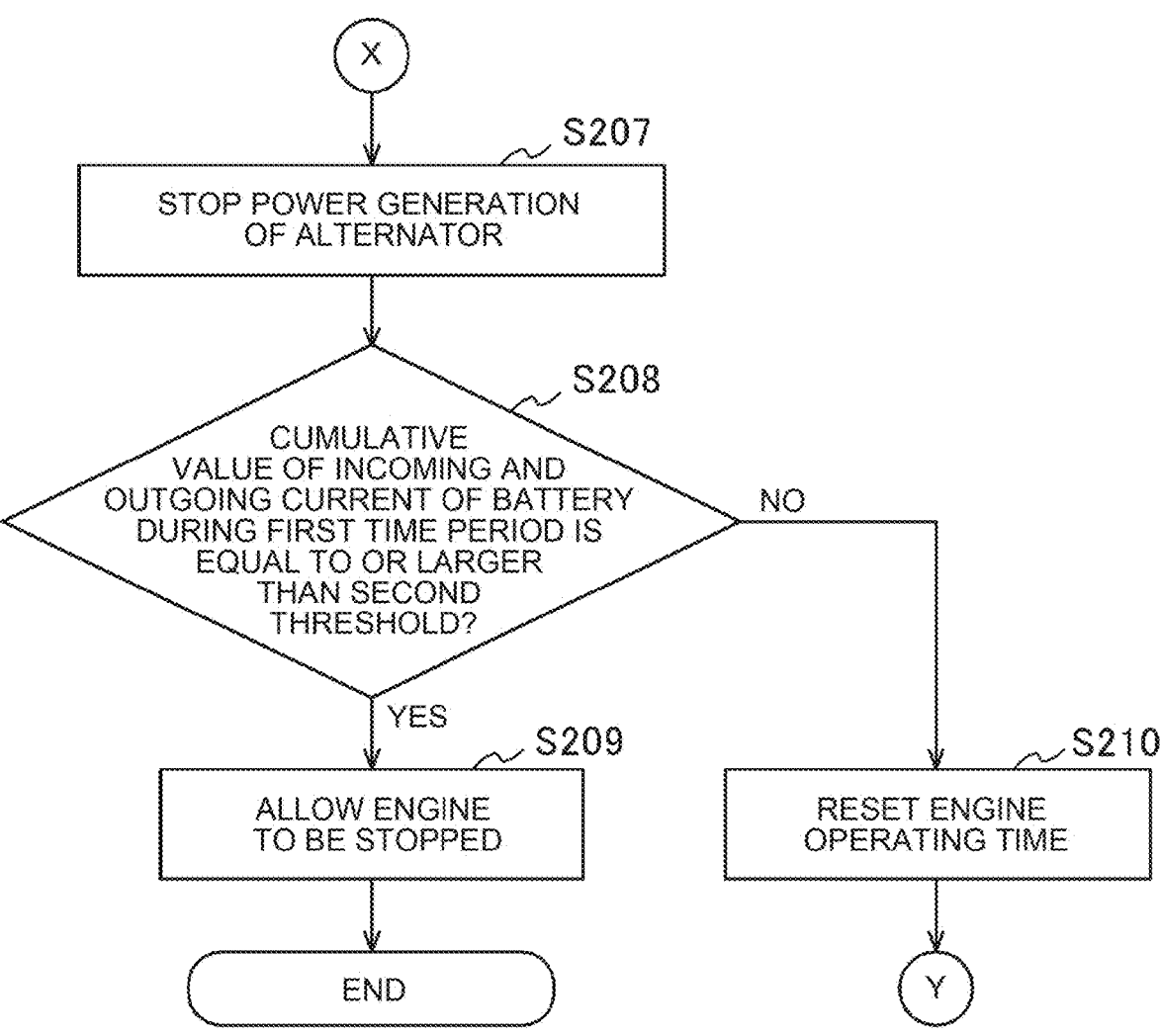
FIG. 2B is a process flowchart of power control executed by a control device.

Note that a part or all of the above-described control device 50 may typically be constituted by an electronic control unit (HV_ECU, EFI_ECU, or the like) including a processor such as a microcomputer, a memory, an input/output interface, and the like. The electronic control unit can realize some or all of the functions performed by the acquisition unit 51 and the control unit 52 by the processor reading and executing the program stored in the memory.
Control Next, the control performed by the control device 50 according to the present embodiment will be described with reference to FIGS. 2A and 2B. FIGS. 2A and 2B are flow charts for describing the steps of the power control executed by the respective components of the control device 50. The process of FIG. 2A and the process of FIG. 2B are connected by the couplers X and Y, respectively.

The power control illustrated in FIGS. 2A and 2B is started, for example, when the power of the vehicles is turned IG-ON, READY-ON. It is assumed that the operation of the alternator 13 is stopped (power is not generated) at the start of the power control, but the operating state of the engine 30 is not particularly limited.
S201

The acquisition unit 51 of the control device 50 acquires information related to the current of the battery 11 from the sensor 14. When the acquisition unit 51 acquires information about the current of the battery 11, the process proceeds to S202.

It should be noted that the acquisition unit 51 appropriately acquires information on the current of the battery 11 based on a predetermined timing (a predetermined cycle or the like) even during processing of each step described later.
S202

The control unit 52 of the control device 50 determines whether or not the battery 11 is in the discharging state. This determination can be made based on the current incoming and outgoing current and/or the cumulative value of the incoming and outgoing current of the battery 11 obtained from the information acquired by the acquisition unit 51 in the above-described S201.

For example, based on the current incoming and outgoing current of the battery 11, the following can be performed. When the power demand (consumed current) by the load 40 does not exceed the power supply capacity (output limit) of DC-to-DC converter 12, the excess power (current) is inputted to the battery 11 and charged, or DC-to-DC converter 12 is controlled so that the excess power is eliminated. Therefore, in this case, since the current flows into the battery 11 or the current becomes zero, the control unit 52 can determine that the battery 11 is in the charging state. On the other hand, when the power demand by the load 40 exceeds the power-supply capability of DC-to-DC converters 12, the battery 11 discharges the amount of power (current) that is insufficient to the load 40. Therefore, in this case, since the current flows out of the battery 11, the control unit 52 can determine that the battery 11 is in the discharging state. Note that the discharging state of the battery 11 may be determined not only based on whether or not there is a current flowing out of the battery 11, but also based on whether or not there is an outgoing current equal to or more than a predetermined threshold value.

Further, based on the cumulative value up to the current incoming and outgoing current of the battery 11, it can be performed as follows. For example, the control unit 52 integrates the current incoming and outgoing current sequentially acquired by the acquisition unit 51 with the negative sign of the outgoing current from the battery 11 using the positive sign of the incoming current to the battery 11. The control unit 52 can determine that the battery 11 is in the charging state if the cumulative value of the incoming and outgoing current in an arbitrary period is a positive value, and can determine that the battery 11 is in the discharging state if the cumulative value of the incoming and outgoing current in an arbitrary period is a negative value. An arbitrary period can exemplify a period from a time point when the battery 11 reaches the specified electric storage capacity (SOC=80%, or the like) to a current time point when the determination is made.

Furthermore, based on both the incoming and outgoing current of the battery 11 and the cumulative value up to the current incoming and outgoing current, for example, if the cumulative value of the incoming and outgoing current is a negative value even if the current flows into the battery 11, it is also possible to determine that the battery 11 is in a discharging state (needs to be charged). In addition, when the cumulative value of the incoming and outgoing current is a positive value, it is also possible to determine that the battery 11 is in a charging state until the current is reduced to the specified storage amount even if the current flows out of the battery 11.

When the control unit 52 determines that the battery 11 is in the discharging state (S202, Yes), the process proceeds to S203. On the other hand, when the control unit 52 determines that the battery 11 is not in the discharging state (S202, No), the process proceeds to S201.

S203

The control unit 52 of the control device 50 brings the engine 30 into an operating state. Specifically, the control unit 52 starts the engine 30 to operate when the engine 30 is in the stopped state, and continues the operating state when the engine 30 is already in the operating state. In addition, the control unit 52 prohibits the engine 30 from being stopped at the same time as the engine 30 is put into an operating state. The stopping prohibition of the engine 30 can be controlled by setting a predetermined prohibition flag to ON or the like. When the control unit 52 activates the engine 30, the process proceeds to S204.

S204

The control unit 52 of the control device 50 starts counting the time during which the engine 30 is operating (hereinafter referred to as "engine operating time"). This time counting is started from the time when the process of S203 is completed by using a predetermined-time timer. When the control unit 52 starts counting the operating hours, the process proceeds to S205.

S205

The control unit 52 of the control device 50 starts power generation by the alternator 13. Thus, the electric power generated by the alternator 13 is supplied to the loads 40 and the batteries 11 together with the electric power outputted from DC-to-DC converters 12. When the control unit 52 starts power generation of the alternator 13, the process proceeds to S206.

S206

The control unit 52 of the control device 50 determines whether the engine operating time has reached the first time period. This determination is made in order to provide a timing for checking the state of the battery 11. Therefore, this first time period is set to a predetermined period of time for which it is desired to check again whether or not the battery 11 remains in the discharging state.

If the control unit 52 determines that the engine-running time has reached the first time period (S206, Yes), the process proceeds to S207. On the other hand, when the control unit 52 determines that the engine operating time has not yet reached the first time period (S206, No), the power generation of the alternator 13 is continued until the first time period is reached.

S207

The control unit 52 of the control device 50 stops power generation by the alternator 13. As a result, only the electric power outputted from DC-to-DC converters 12 is supplied to the loads 40 and the batteries 11. When the power generation of the alternator 13 is stopped by the control unit 52, the process proceeds to S208.

S208

The control unit 52 of the control device 50 determines whether the cumulative value of the incoming and outgoing current of the battery 11 during the first time period is equal to or greater than the second threshold. Specifically, the control unit 52 calculates a cumulative value (with a positive or negative sign) by sequentially cumulating the incoming and outgoing current currents of the battery 11 acquired by the acquisition unit 51 until the engine operating time reaches the first time period, and compares the calculated cumulative value of the incoming and outgoing current with the second threshold. This determination is made to determine whether the battery 11 remains in the discharging state. Therefore, the second threshold is set to a predetermined amount of current that can determine that the battery 11 is no longer in the discharging state.

When the control unit 52 determines that the cumulative value of the incoming and outgoing current of the battery 11 during the first time period is equal to or larger than the second threshold (S208, Yes), it is determined that power generation by the alternator 13 is not necessary, and the process proceeds to S209. On the other hand, when the control unit 52 determines that the cumulative value of the incoming and outgoing current of the battery 11 during the first time period is less than the second threshold (S208, No), it is determined that power generation by the alternator 13 is still required, and the process proceeds to S210.

S209

The control unit 52 of the control device 50 permits the engine 30 to be stopped. The stopping permission of the engine 30 can be controlled by setting a predetermined prohibition flag to OFF or the like. When the stop of the engine 30 is permitted by the control unit 52, this power control is ended.

S210

The control unit 52 of the control device 50 resets the engine operating time. As a result, the timing of the engine operating time is started again from zero. When the control unit 52 resets the operating period, the process proceeds to S204.

Operations and Effects

As described above, according to the control device 50 according to the embodiment of the present disclosure, when the battery 11 is in a discharging state in which current is output to the load 40, stopping of the engine 30 in operation is prohibited so that the alternator 13 can be operated by the engine 30 to generate electric power.

By this control, when the power demand (consumed current) by the load 40 exceeds the supply capacity (output limit) of DC-to-DC converter 12, the battery 11 can switch the power supplied to the load 40 to the power of the alternator 13 by causing the alternator 13 to generate electric power. Therefore, it is possible to maintain the specified amount of electricity storage (control target amount) defined in the battery 11 without being affected by the fluctuation of the power demand in the load 40.

Further, according to the control device 50 of the present embodiment, it is possible to determine whether or not the battery 11 is in the discharging state by using the detection value of the battery sensor originally mounted on the vehicle. Therefore, the above-described power control can be realized at low cost without adding a new hardware configuration.

Although an embodiment of the present disclosure has been described above, the present disclosure can be regarded as not only a control device but also a method executed by a control device including a processor, a memory, and the like, a program for executing the method, a computer-readable non-transitory storage medium storing a program, a vehicle equipped with a control device, and the like.

The control device of the present disclosure is applicable to a vehicle equipped with a power supply system including a DC-to-DC converter and an alternator, and in particular, to a vehicle for intermittently stopping an engine for improving fuel efficiency and reducing emissions.

What is claimed is:

1. A control device that controls a power supply system, the power supply system including a DC-to-DC converter that supplies electric power of a power supply source to a load, an alternator connected with the DC-to-DC converter in such a manner that the alternator is able to supply electric power generated by rotation of an engine to the load, and a battery connected to the load in such a manner that the battery is able to supply electric power to the load, the control device comprising a processor configured to:

acquire battery current information, the battery current information indicating a magnitude of current supplied from the battery; and control an operation of the engine and an operation of the alternator based on the battery current information, wherein the processor is further configured to:

perform a first determination as to whether the battery is in a discharging state, in which the battery outputs a current to the load, based on the battery current information; and in response to the first determination that the battery is in the discharging state, prohibit the engine that is running from being stopped.

2. The control device according to claim 1, wherein:

the battery current information includes information on an incoming current and an outgoing current of the battery;

the battery current information is acquired sequentially;

the first determination that the battery is in the discharging state is based on a cumulative value of the incoming current and the outgoing current from a predetermined time point up to current.

3. The control device according to claim 1, wherein the processor is further configured to:

in response to the first determination that the battery is in the discharging state, start power generation by the alternator;

after the alternator generates electric power for a first time period, stop the power generation by the alternator, and perform a second determination as to whether the battery is in the discharging state based on the battery current information; and in response to the second determination that the battery is not in the discharging state, control the engine to allow the engine to be stopped.

4. The control device according to claim 3, wherein:

the battery current information includes information on an incoming current and an outgoing current of the battery;

the battery current information is acquired sequentially;

in a case where a cumulative value of the incoming current and the outgoing current of the battery during the first time period is equal to or larger than a predetermined threshold, the processor is configured to determine that the battery is not in the discharging state in the second determination.

5. The control device according to claim 1, wherein the processor is configured to prohibit the engine that is running from being stopped by setting a predetermined prohibition flag to ON.

6. The control device according to claim 3, wherein the processor is configured to control the engine that is running to allow the engine to be stopped by setting a predetermined prohibition flag to OFF.

7. The control device according to claim 1, wherein:

the battery current information includes information on a current incoming current and a current outgoing current of the battery; and the first determination that the battery is in the discharging state is based on the current incoming current and the current outgoing current of the battery.

* * * * *